United States Patent [19]
Benke et al.

[11] Patent Number: 5,628,394
[45] Date of Patent: May 13, 1997

[54] SWITCHGEAR WITH TOP MOUNTED VERTICAL TAKEOFF TRIPPING AND SPRING RELEASE INTERLOCK

[75] Inventors: James J. Benke; Francois Marchand, both of Pittsburgh; John J. Hoegle, Beaver, all of Pa.

[73] Assignee: Eaton Corporation, Cleveland, Ohio

[21] Appl. No.: 621,570

[22] Filed: Mar. 25, 1996

[51] Int. Cl.⁶ ................................................. H01H 5/00
[52] U.S. Cl. ........................................ 200/400; 200/401
[58] Field of Search ................................. 200/400, 401; 335/6, 9, 10, 11, 13

[56] References Cited

U.S. PATENT DOCUMENTS

| | | | |
|---|---|---|---|
| 4,343,030 | 8/1982 | Date et al. | 200/400 |
| 4,475,021 | 10/1984 | Mochizuki | 200/400 |
| 4,743,876 | 5/1988 | Milianowicz et al. | 335/20 |

OTHER PUBLICATIONS

Westinghouse & Cutler/-Hammer Products; *Instructions for the Use, Operation and Maintenance of the Red Line Type VCP-WR Vacuum Circuit Breaker Elements;* I.B. 8295A61H01; Apr. 1, 1994.

*Primary Examiner*—David J. Walczak
*Attorney, Agent, or Firm*—Martin J. Moran

[57] ABSTRACT

Switchgear with a closing spring release and an opening release accessible from a front face is further provided with top mounted closing and opening spring releases. In order to avoid interference with internal parts of the switchgear and to follow the movement of the trip mechanisms to which they are connected, these top mounted spring releases are flexible elongated members preferably in the form of flat stainless spring steel straps. The flat strap of the top mounted opening spring release has a slot engaging the opening trip lever and is sized so as not to engage the trip lever when the front accessible spring release is otherwise actuated. As the horizontal pivot axis of the closing spring trip lever moves transversely, the flat strap of the top mounted closing spring release is oriented to bend in the same direction while the lower end section is twisted 90° to receive a coupling pin on the trip lever.

11 Claims, 7 Drawing Sheets

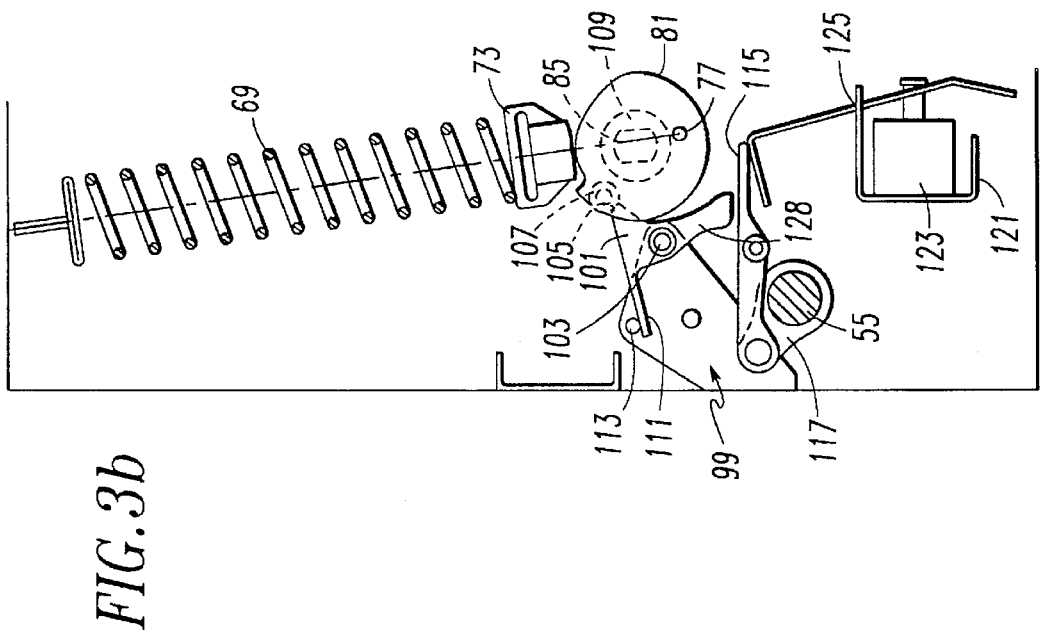
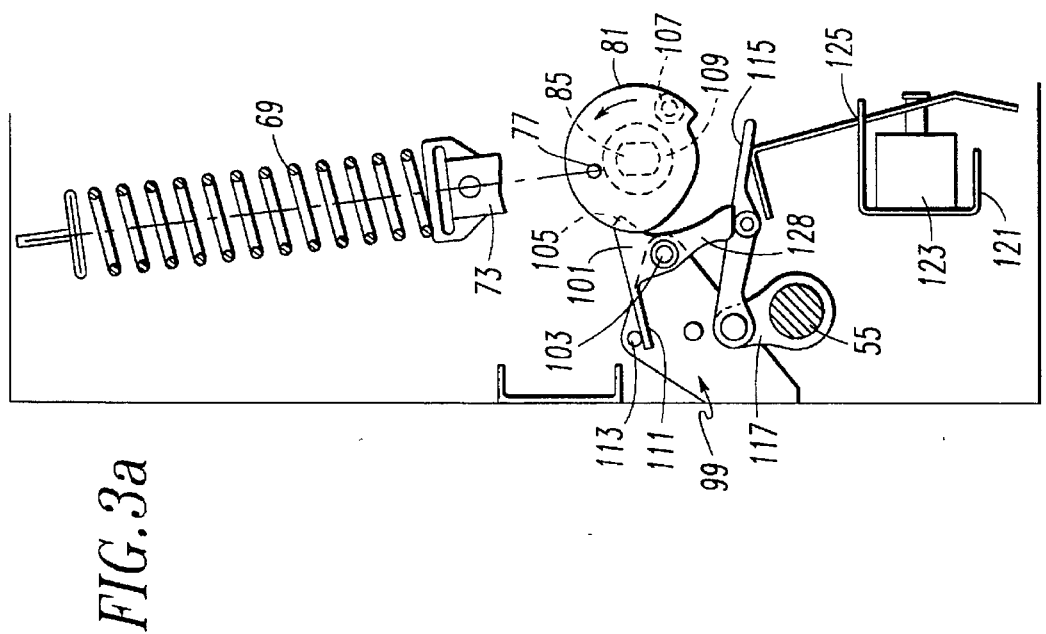

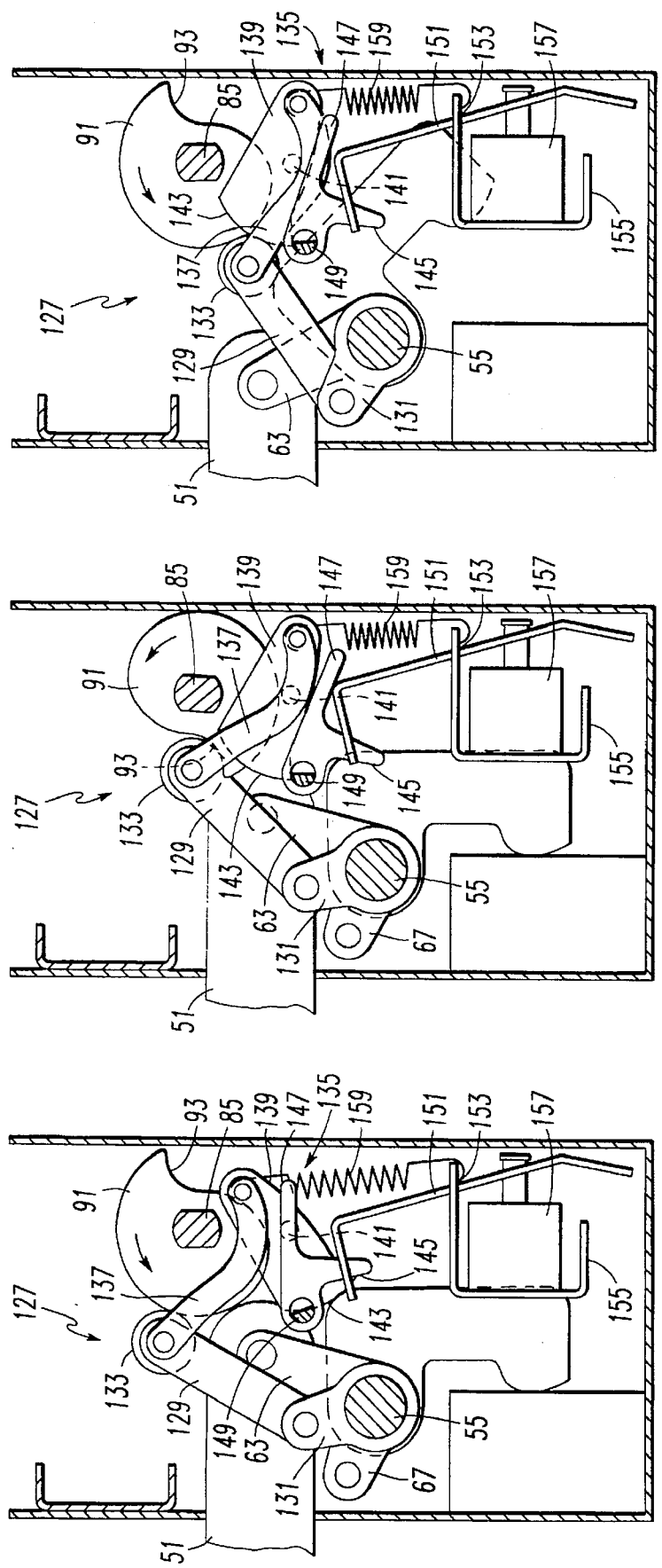

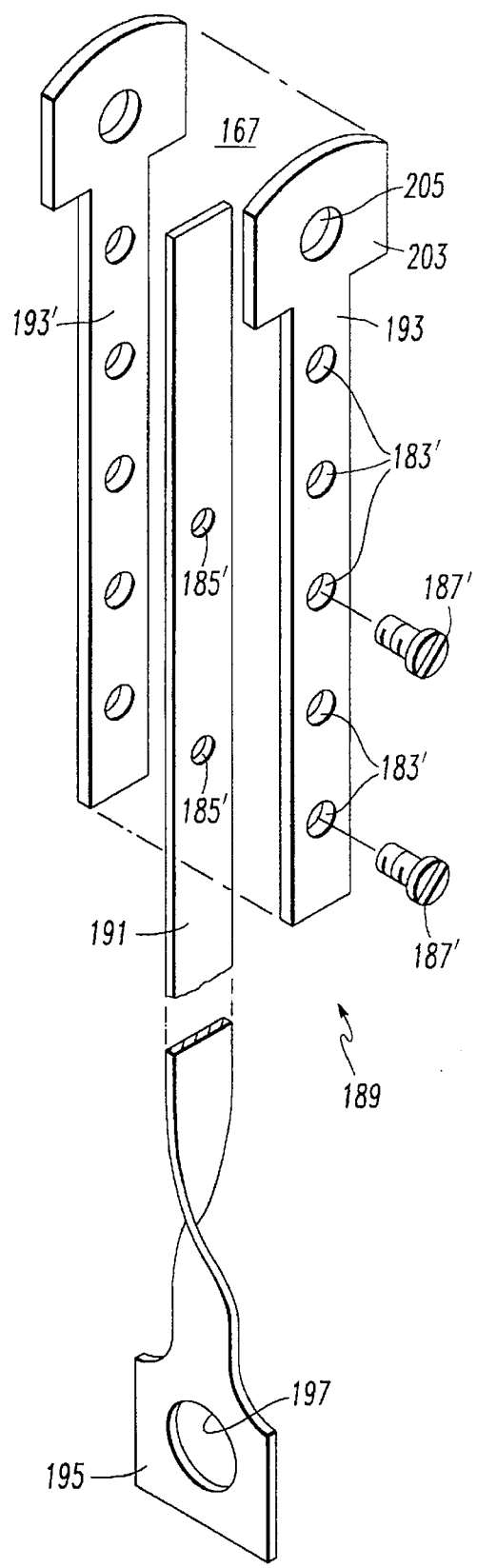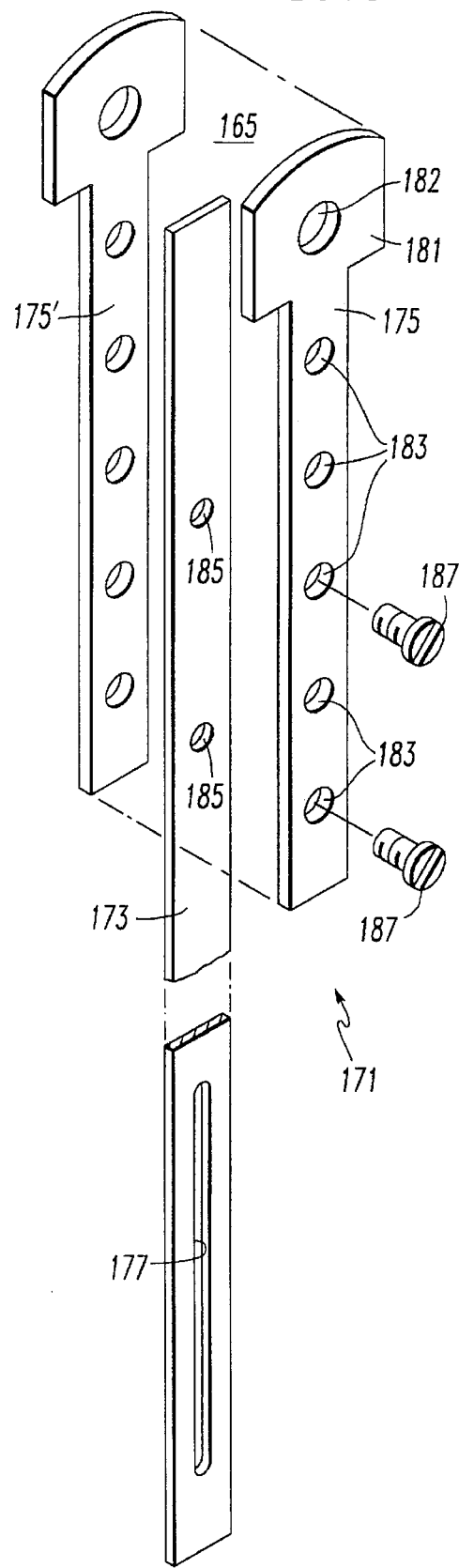

SWITCHGEAR WITH TOP MOUNTED VERTICAL TAKEOFF TRIPPING AND SPRING RELEASE INTERLOCK

BACKGROUND OF THE INVENTION

1. Field of the Invention

This invention relates to interlocks for switchgear, and particularly to apparatus which permits tripping and discharge of the springs from the top of the unit.

2. Background Information

Medium voltage switchgear typically comprise a switching mechanism housed in a metal enclosure. The switching mechanism incudes separable contacts for each phase and a common spring operated closing and tripping device. This device includes a spring which trips the contacts open and a pair of closing springs which close the contacts and charge the opening spring. The closing springs are charged manually by a lever arm through a ratchet coupling, and alternatively in some installations, by an electric motor.

The separable contacts are closed by releasing the energy stored in the closing springs through activation of a closing trigger mechanism. This can be done manually or remotely through a solenoid. An electronic trip circuit monitors the load currents and actuates an opening trigger mechanism through an opening solenoid if the current exceeds certain current-time characteristics.

In one type of such medium voltage switchgear, the switching mechanism is mounted in a drawer which rolls on horizontal rails into engagement with line and load conductor terminations within the enclosure. In another arrangement, the switching mechanism is moved horizontally into the enclosure and then raised vertically for engagement with the terminations.

The forces required for rapid opening of the separable contacts of the circuit breaker dictate the use of a sizable opening spring. The combined forces generated by the closing springs is even larger, as they charge the opening springs, as well as close the separable contacts.

The energy stored in these springs creates a potential danger to service personnel which is in addition to the electrical hazard. It is important then that all of the springs are discharged before maintenance is performed on the breaker, or before it is removed from the enclosure.

The type of switchgear in which the circuit breaker moves horizontally into engagement with the conductor terminations includes a cam mechanism below the circuit breaker which actuates the trip mechanisms to automatically discharge both the closing and opening springs as the circuit breaker is inserted or removed from the cabinet. The other type of switchgear in which the circuit breaker is raised to engage the conductor terminations does not have a mechanism which can trip the spring release triggers from below the circuit breaker. Instead, the circuit breakers in this type of switchgear have devices actuated from above to trip the spring release triggers.

There is a need for apparatus which enables circuit breakers of the type designed for moving horizontally into engagement with the conductor terminations to be used in switchgear in which the circuit breaker is raised to engage the conductor terminations.

Specifically, there is a need for apparatus which trips the spring release triggers of such circuit breakers from above.

Furthermore, there is a need for such apparatus which requires minimal modification to the circuit breaker and which is economical and easy to install.

SUMMARY OF THE INVENTION

These needs and others are satisfied by the invention which is directed to switchgear of the type having a housing containing separable contacts and an operating mechanism for opening and closing the separable contacts. The operating mechanism includes a pole shaft and means connecting the pole shaft to open and close the separable contacts upon rotation. The switchgear further includes an opening spring means coupled to the pole shaft to rotate the pole shaft to open the contacts when released, and closing spring means coupled to the pole shaft to rotate the pole shaft to close the separable contacts and to charge the opening spring means when released, and which is charged by charging means. First spring release means accessible from the front face of the housing releases the closing spring means. Second spring release means also accessible from the front face of the housing releases the opening spring means. In addition, first top mounted spring release means accessible at the upper face of the housing are coupled to the first spring release means for releasing the closing spring means from the upper face. Second top mounted spring release means accessible at the upper face of the housing are coupled to the second spring release means for releasing the opening spring means from the top of the switch gear.

The top mounted spring release means comprise flexible elongated members and means coupling the flexible elongated members to the first and second spring release means. Typically, the coupling means comprises a lever rotatable about a generally horizontal pivot axis. The flexible elongated members are preferably flat straps oriented so that they are bendable in a plane transverse to the generally horizontal pivot axis of the coupling lever. In one instance, the flat strap has a slot which engages the lever arm. Preferably, this slot is of a length so that the flat strap does not engage the lever when the associated spring release mechanism is actuated normal spring release means. The other flat strap has a lower section which is twisted about 90° for pivotable connection to the lever arm. Preferably, this connection comprises an aperture in the lower section of the flat strap which is engaged by a pivot pin on the lever arm. This arrangement is particularly suitable in the case of the closing spring release mechanism wherein the pivot axis for the lever translates transversely generally in a horizontal direction. The flat strap bendable in the direction generally transverse to this local pivot axis allows the top release mechanism to follow the movement of the pivot axis of the lever. In addition, both of the flat strap connections to the actuating members is such that motion, vibration, oscillation, and shock to the system do not cause nuisance actuation of the device.

BRIEF DESCRIPTION OF THE DRAWINGS

A full understanding of the invention can be gained from the following description of the preferred embodiments when read in conjunction with the accompanying drawings in which:

FIG. 3a is a sectional view taken along the line 3—3 in FIG. 2 shown with the breaker in the open position and the closing springs discharged.

FIG. 3b is similar to FIG. 3a but showing the breaker closed with the closing springs charged.

FIG. 4a is a sectional view taken along the line 4—4 in FIG. 2 showing the breaker open and the closing spring discharged.

FIG. 4b is similar to the FIG. 4a but showing the breaker in the open position and the closing springs charged.

FIG. 4c is similar to FIGS. 4a and b but showing the breaker closed and the closing springs discharged.

FIG. 7 is an exploded isometric view of the elongated member of the top mounted closing spring release.

FIG. 8 is an exploded isometric view of the elongated member of the top mounted opening spring release.

DESCRIPTION OF THE PREFERRED EMBODIMENTS

Figure 1:
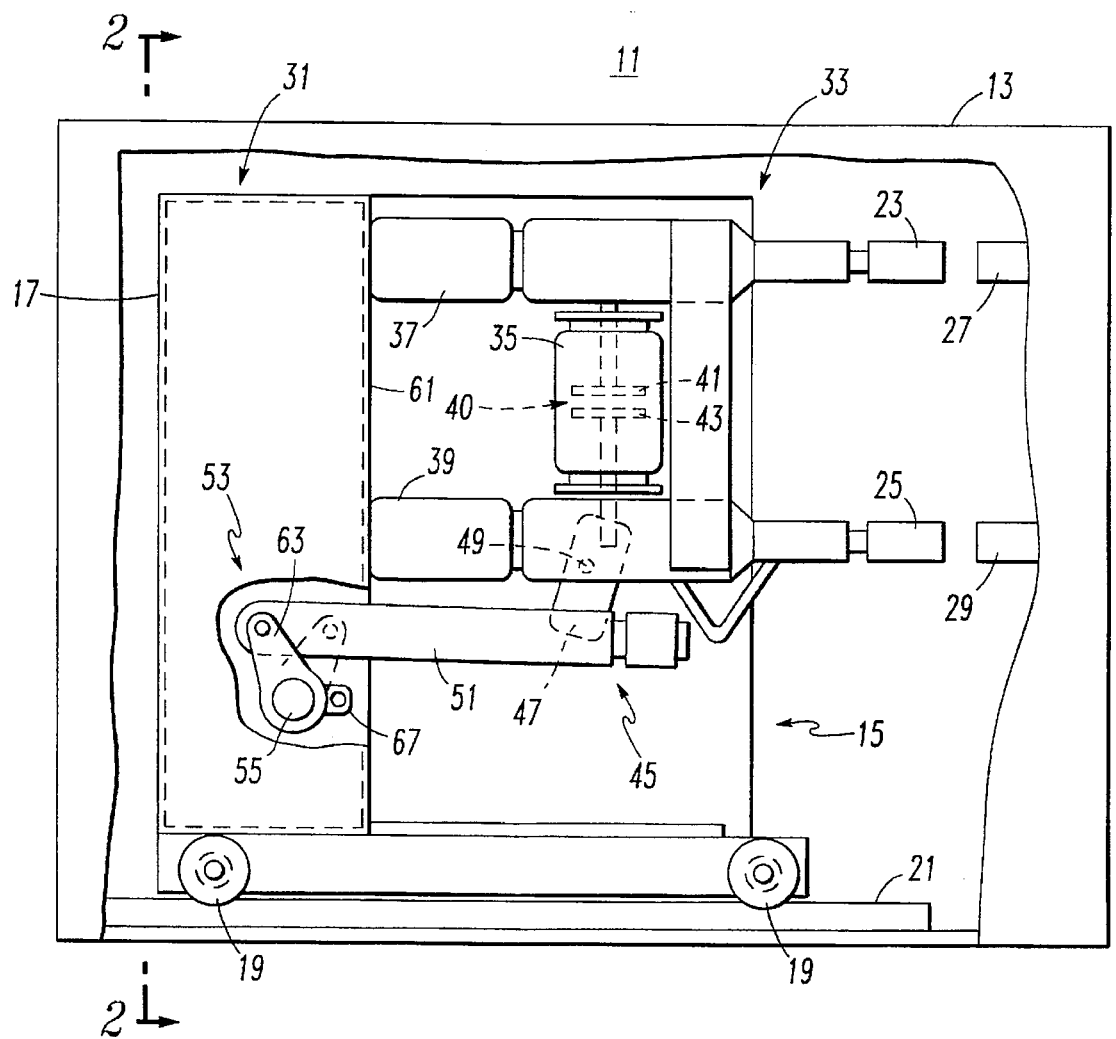
FIG. 1 is a side elevational view with some parts cut away with a medium voltage circuit breaker in accordance with the invention shown in the disconnected position.
Figure 2:
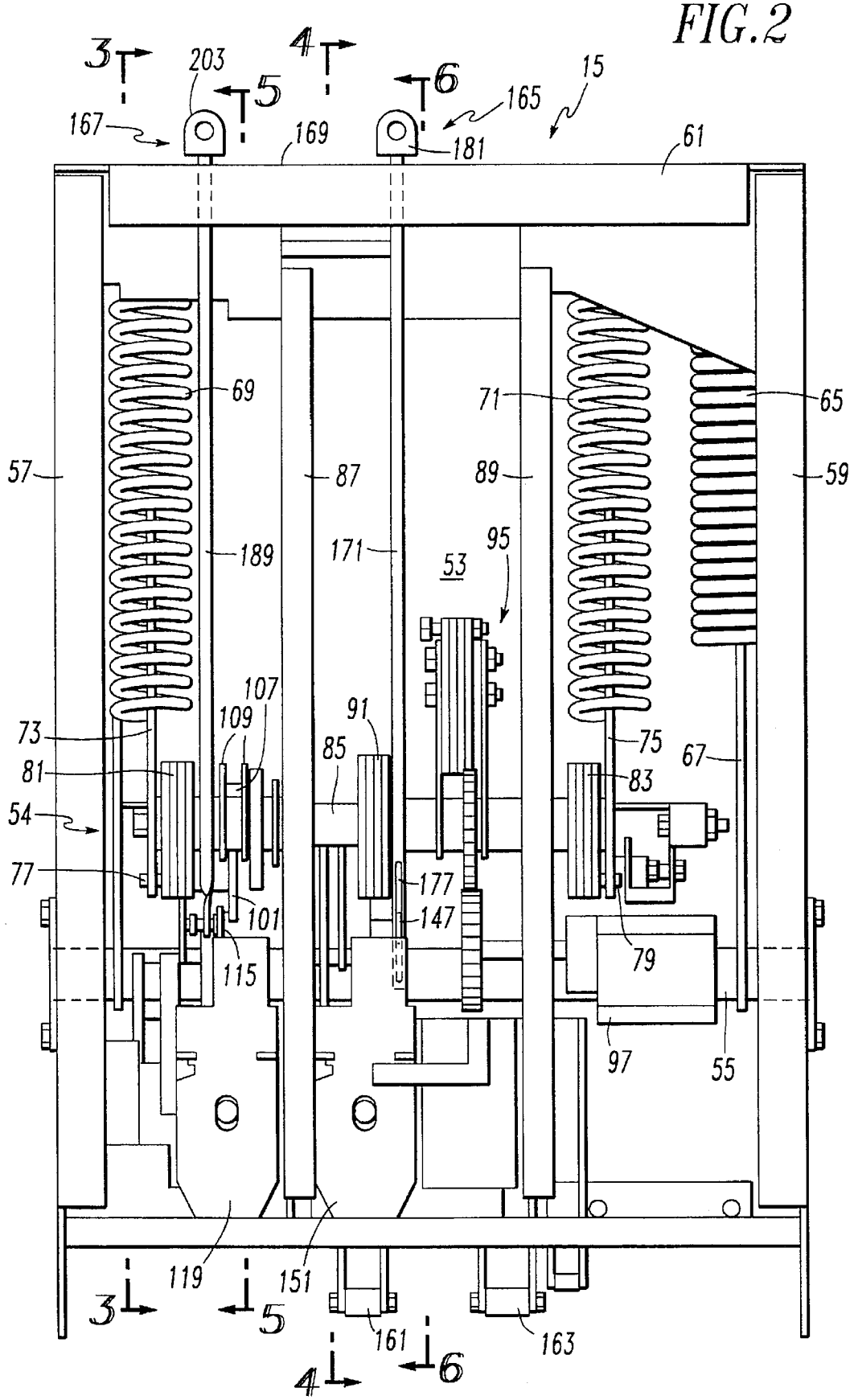
FIG. 2 is a front elevation view of a typical circuit breaker with the cover removed.

As shown in FIGS. 1 and 2, a metal-clad or metal-enclosed switch gear apparatus 11 includes a metal cabinet or enclosure 13 for enclosing a circuit breaker 15. The circuit breaker 15 is preferably a draw-out three-phase vacuum circuit interrupter having controls on a front face 17 for manually operating the circuit breaker. The circuit breaker 15 has wheels 19 which engage rails 21 for inserting the circuit breaker into and removing the circuit breaker from the enclosure 13. Movement of the circuit breaker 15 along the rails 21 also effects connection and disconnection of terminals 23 and 25 on the circuit breaker 15 with line and load terminals 27 and 29 mounted in the enclosure 13, in a well known manner. While a medium voltage vacuum interrupter is shown for the circuit breaker 15, the invention is also applicable for use with air circuit breakers.

The circuit breaker 15 has a front low voltage section 31 adjacent to the front panel 17 and a rear high voltage section 33 containing a vacuum interrupter 35 for each phase. The low and high voltage sections 31, 33 are electrically insulated from each other by upper and lower insulators 37 and 39. Within each vacuum interrupter 35, a pair of separable contacts 40 including a stationary contact 41 and a moveable contact 43 are provided. The contacts 40 are operated between the open position (shown) and a closed position by a linkage 45 which includes a bell crank 47 pivoted at 49 and an insulated push rod 51 extending into the low voltage section 31.

An operating mechanism 53 for opening and closing the separable contacts 40 through the linkage 45 is contained in the low voltage section 31. This operating mechanism 53 has a number of driven parts 54 which include a pole shaft 55 which is rotatably journaled in side walls 57 and 59 of a frame or housing 61. A pole arm 63 for each phase projects laterally from the pole shaft 55 and is pivotally connected to the associated push rod 51 so that rotation of the pole shaft 55 simultaneously opens or closes the separable contacts 40 of each pole. The pole shaft 55 is rotated counter-clockwise as viewed in FIG. 1 to open the contacts 40 by an opening spring 65 in the form of a helical tension spring connected one end to an upper portion of the frame 61 of the low voltage section 31 and at the other end to a lever arm 67 mounted on the pole shaft 55.

The operating mechanism 53 also includes a pair of helical tension closing springs 69 and 71 each of which is connected at its upper end to the frame 61 and at its lower end through a spring link 73, 75 to an eccentric pivot 77, 79 on a spring cam 81, 83, respectively. The spring cams 81 and 83 are mounted on opposite ends of a cam shaft 85 rotatably supported between a pair of spaced supports 87 and 89. Fixed on the cam shaft 85 between the supports 87 and 89 is a closing cam 91 which includes a notch 93 in the peripheral cam surface thereof (see FIGS. 4a–c).

The cam shaft 85 is rotated to extend or charge the two closing springs 69 and 71 by a charging mechanism 95 engaging the cam shaft between the closing cam 91 and the support 89. As is well known, this charging mechanism 95 includes an electric motor 97 which can be energized to rotate the cam shaft 85 counterclockwise as shown by the arrows in FIGS. 4a–c through a ratchet. Alternatively, as is known, the cam shaft can be manually rotated to charge the closing springs 69, 71 by a charging lever (not shown) which engages the charging mechanism 95. The closing springs 69 and 71 are retained in the charged condition and released by a first, closing spring release 99 (see FIGS. 3a and b) which includes a close spring release latch 101 pivotally connected on a shaft 103. This closing spring release latch has a latch surface 105 which is engaged by a latch roller 107 supported between a pair of roller support arms 109 fixed to the cam shaft 85.

With the circuit breaker open and the closing springs 69 and 71 discharged as shown in FIG. 3a, operation of the charging mechanism 95 causes the cam shaft 85 to rotate in a counterclockwise direction as shown by the arrow. This causes the eccentric pivots 77, 79 to move downward thereby extending the closing springs 69 and 71. Just after the eccentric pivots 77, 79 carry the lines of action of the closing springs 69, 71 through the center of the cam shaft 85, the closing latch roller 107 engages the latch surface 105 on the closing spring release latch 101. The tendency of the closing spring 69, 71 to continue the rotation in the clockwise direction is blocked by the engagement of an extension 111 on the release latch 103 with a fixed pin 113.

Figure 5:
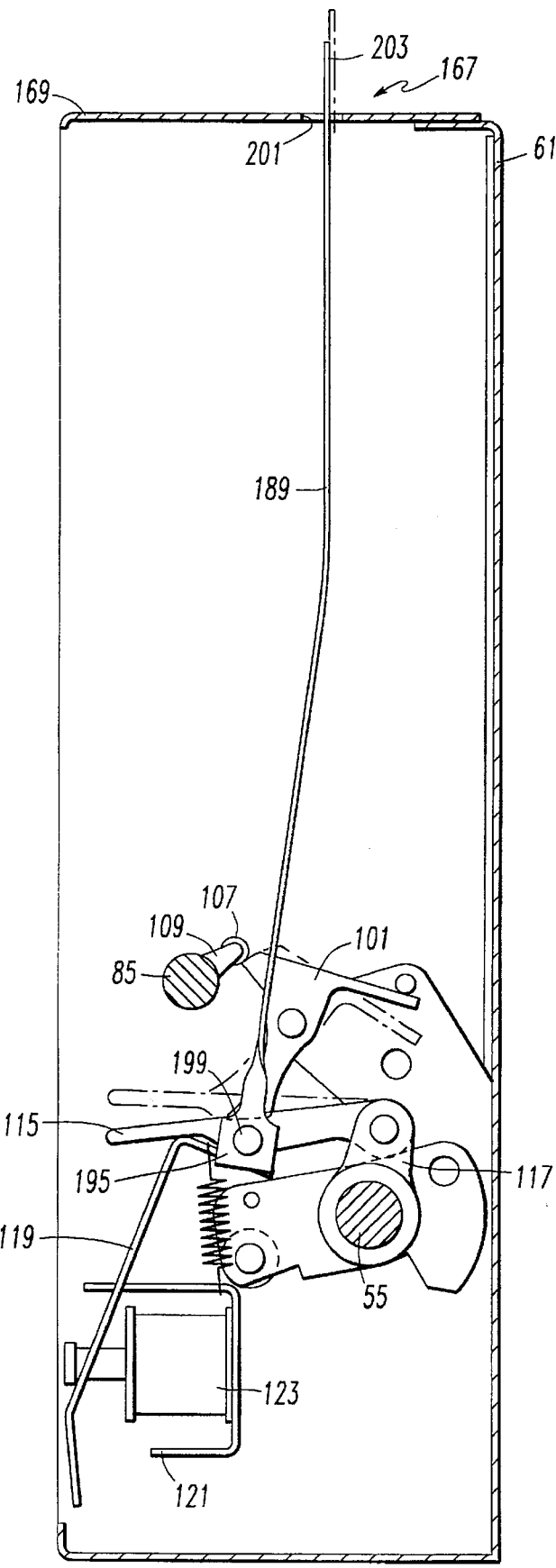
FIG. 5 is a sectional view taken along the line 5—5 and FIG. 2 illustrating operation of the top mounted closing spring release in accordance with the invention.

The release latch 101 is operated by a release lever 115 pivotally connected at one end to an arm 117 on the pole shaft 55. The other end of the release lever 115 rests on a close clapper 119. The close clapper 119 in turn is pivotally supported on a bracket 121 which also supports a close solenoid 123. Rotation of the close clapper 119 clockwise in FIG. 5b about a pivot axis 125, either manually by pressing on the lower end of the clapper, or automatically by energization of the close solenoid 123, causes counterclockwise rotation of the release lever 115. The release lever 115 engages a projection 128 on the close spring release latch 101 which is rotated counterclockwise until the close latch roller 107 slips off of the latch surface 105. This permits the closing springs 69 and 71 to rapidly rotate the cam shaft 85. As will be seen, this results in rotation of the pole shaft 55 to close the separable contacts 40 of the circuit breaker. The force generated by two closings springs is required as they not only operate the mechanism 53 to close the separable contacts 40, but they also charge the opening spring 65. With the circuit breaker closed as shown in FIG. 3b, the release lever 115 is lowered so that if the closing springs 69, 71 are recharged (as shown), the release lever 115 will not engage the closing spring release latch 101 and thus the closing springs cannot be discharged. This maintains the circuit breaker 15 ready for a reclose should the breaker trip open.

The operating mechanism 53 also includes a coupling mechanism 127 for coupling the cam shaft 85 to the pole shaft 55. This coupling mechanism includes a pair of parallel main links 129 each pivotally connected at one end to the pole shaft 55 through a crank arm 131 and rotatably supporting a main link roller 133 between their free ends. This main link roller 133 engages the peripheral surface of the closing cam 91 which, as the crank shaft rotates, pushes on the main links 129 to rotate the pole shaft 55 through the eccentricity in the cam surface. Opening spring release mechanism 135 includes a banana link 137 pivoted at one end on a common axis with the main roller link 133 and at the other end to one end of an open trip latch or "hatchet" 139. The open trip latch 139 is mounted on a fixed pivot pin 141 and has a free curved end 143 forming a latch edge 145. The second, opening spring release mechanism 135 also includes a trip lever 147 fixed to a rotatable trip lever "D-shaft" 149. The trip lever 147 rests on the upper end of an opening clapper 151 pivotally supported at 153 by a bracket 155 on which is mounted an opening solenoid 157. A trip latch reset spring 159 connected to this bracket, biases the open trip latch 139 clockwise as shown in FIG. 4a to the latch position as shown in FIGS. 4b and c wherein the latch edge 145 is engaged by the D shaft 149.

FIGS. 4a–c illustrate the coupling of the cam shaft to the pole shaft to close the circuit breaker and tripping of the opening spring release mechanism 135 to open the circuit breaker. FIG. 4a illustrates the position of the parts with the circuit breaker open and the closing springs 69 and 71 discharged. As can be seen, the push rod 51 is retracted so that the separable contacts 40 are open. The sequence is initiated by operation of the charging mechanism 95 to rotate the cam shaft 85 in the counterclockwise direction to charge the closing springs 69, 71 in the manner described above. The trip latch reset spring 159 biases the main link roller 133 against the peripheral caming surface of the closing cam 91 until it falls into the notch 93 with the springs 69, 71 latched in the charged condition. This permits the trip latch reset spring 159 to rotate the open trip latch 139 clockwise to the latched position in which the latch edge 145 is engaged by the D shaft 149 as shown in FIG. 4b. When the closing spring release 99 is actuated, the closing springs 69, 71 rapidly rotate the cam shaft 85 in the manner described above with reference to FIGS. 3a and b. The increasing effective diameter of the closing cam 91 produced by the eccentricity of the cam surface, pushes the main links 129 downward and to the position shown in FIG. 4c. This rotates the pole shaft 55 in the counterclockwise direction to drive the push rod 51 to the left to close the separable contacts 40. As can be seen in FIG. 4c, the open trip latch 139 remains engaged by the D shaft 149.

The circuit breaker is opened manually by pressing on the lower end of the open clapper 151. In addition, it can be opened automatically by actuation of the open solenoid 157 which rotates the open clapper 151 clockwise. The open solenoid 157 is energized by an electronic trip unit in response to current which exceeds predetermined current/ time characteristics. Alternatively, the open solenoid 157 can be energized from a remote source to open the circuit breaker. In any case, rotation of the open clapper 151 in the clockwise direction rotates the open trip lever 147 and with it the D shaft 149. The force generated by the charged opening spring 65 through the main links 129 and banana link 37 rotates the open trip latch 139 counterclockwise past the D shaft. This allows the opening spring 65 to rotate the pole shaft 55 to withdraw the push rods 51 and open the separable contacts 40 as the main link roller 133 rolls along the outer surface of the closing cam 91 to the position shown in FIG. 4a.

Figure 6:
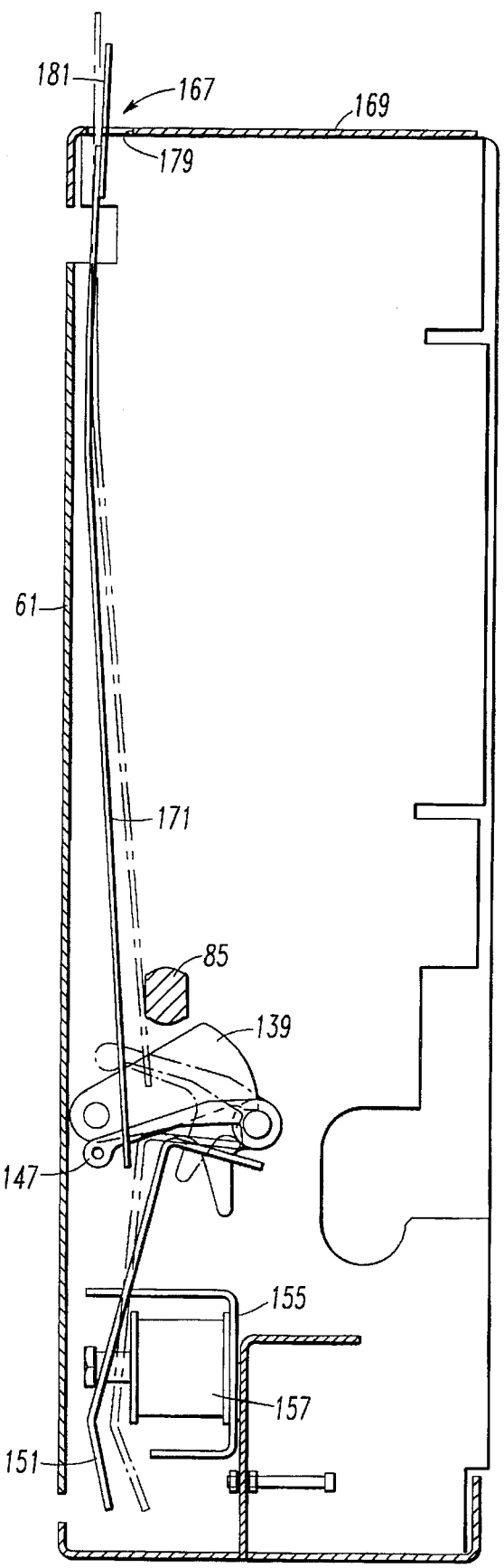
FIG. 6 is a sectional view taken along the line 6—6 in FIG. 2 illustrating generation of the top mounted opening spring release in accordance with the invention.

As shown in FIG. 2, a pair of floor trippers 161 and 163 extend below the frame 61 of the circuit breaker 15 where they are engaged by cams (not shown) in the switch gear enclosure 13 as the circuit breaker is inserted in and withdrawn from the enclosure. These floor trippers are connected with the closing spring release mechanism 99 and the opening spring release mechanism 135 to assure that the circuit breaker is open and the springs are discharged. As mentioned above, it is an object of the present invention to use the circuit breaker described in enclosures which do not have cams for horizontal mounting and engaging of these floor trippers. For these applications, top mounted spring release mechanisms 165 and 167 are provided. The top mounted spring release mechanisms of the invention can be used for horizontal and vertical mounting and engagement of the circuit breaker. These auxiliary spring release mechanisms are accessible from the top face 169 of the circuit breaker 115. The second, top mounted open spring release mechanism 165 comprises a flexible elongated member 171 which as shown in FIG. 8 comprises a main body portion 173 and an upper section 175. The main body 173 comprises a flat, preferably spring stainless steel, strap oriented parallel to the plane of FIG. 2 so that it may bend into and out of the plane of that figure. Adjacent a lower end of the main body 173 is an elongated slot 177 which, as can be seen in FIGS. 2 and 6 engages the open trip lever 147. This slot 177 is long enough to avoid interference with normal operation of the open trip lever 147.

The upper section extension 175, which is also made of flat spring steel, passes through an opening 179 (see FIG. 6) in the top face 169 of the circuit breaker and has a broadened terminal portion 181 which forms a stop for suspending the elongated member 171 from the top face and has an aperture 182. The flexible elongated member 171 is made in two parts 173 and 175 for use with a number of different sized circuit breakers 15. Thus, the upper section 175 has a plurality of holes 183 which can be joined to different sets of holes 185 in the main body 173 by fasteners 187 to provide the required length for the flexible elongated member 171. For additional strength and support item 175 can be duplicated as indicated at 175' with the two pieces 175 and 175' clamping the main body 173 between them. As shown in FIG. 7, the first, top mounted close spring release mechanism 167 also comprises a flexible elongated member 189 having a main body 191 which is overlapped by an upper section 193 by a selected amount by aligning holes 183' with holes 185' for fasteners 187' to provide a suitable overall length. The main body 191 is also made of flat spring steel oriented with its plane parallel to the plane of FIG. 2. The lower end 195 of the main body 191 is twisted 90° so that its plane is perpendicular to the plane of FIG. 2. This lower end section 195 has an aperture 197 which engages a pivot support 199 on the close release lever 115. As is evident from FIGS. 3a and b, this pivot support 199 moves fore and aft in the circuit breaker housing as the pole shaft 55 is rotated between the open and closed positions. The flat spring steel strap forming the main body 191 permits the flexible elongated member 189 to accommodate for this translation of the pivot point. Again, the upper section 193 can be duplicated as at 193' for additional strength and support.

As in the case of the top mounted opening spring release, the upper section 193 extends through an opening 201 in the top face 169 and has a broad terminal portion 203 with an aperture 205.

The top mounted close mechanism 167 can be raised to discharge the closing springs 69, 71 from the upper face of the circuit breaker in the same manner as described through operation of the close solenoid 123 or close clapper 121. Similarly, raising the top mounted open mechanism 167 discharges the open spring 65 to open the separable contacts 40. The terminal portions 203, 181 of these mechanisms can be engaged by an interlock (not shown) which automatically operates these auxiliary open and close mechanisms in a manner similar to the floor tripper to assure that the circuit breaker is in the open condition and the springs are discharged for installing and removing the circuit breaker from the enclosure and for maintenance.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Switchgear comprising:

a housing having a front face and an upper face;

separable contacts mounted within said housing; and an operating mechanism for opening and closing said separable contacts and comprising:

a pole shaft mounted in said housing for rotation;

connecting means connecting to said pole shaft to said separable contacts for opening and closing said separable contacts in response to rotation of said pole shaft;

opening spring means in said housing coupled to said pole shaft to rotate said pole shaft to open said separable contacts when released;

closing spring means in said housing coupled to said pole shaft to rotate said pole shaft to close said separable contacts and to charge said opening spring means when released;

means for charging said closing spring means;

first spring release means accessible from said front face of said housing for releasing said closing spring means;

second spring release means accessible from said front face of said housing for releasing said opening spring means;

first top mounted spring release means accessible at said upper face of said housing for releasing said closing spring means from said upper face; and second top mounted spring release means accessible at said upper face of said housing for releasing said opening spring means from said upper face.

2. The switchgear of claim 1 wherein at least one of said first and second top mounted spring release means comprises a flexible elongated member and coupling means coupling said flexible elongated member to an associated one of said first and second spring release means.

3. The switchgear of claim 2 wherein said coupling means comprises a lever rotatable about a generally horizontal pivot axis and said flexible elongated member has a slot engaging said lever.

4. The switchgear of claim 3 wherein said flexible elongated member is a flat strap bendable in a plane transverse to said generally horizontal pivot axis.

5. The switchgear of claim 4 wherein said slot has a length such that said flat strap does not engage said lever when said associated spring release means is actuated.

6. The switchgear of claim 5 wherein said upper face of said housing has an opening through which said flat strap extends, said flat strap having an upper terminal member larger than said opening which bears against said upper face and from which said flat strap is suspended through said opening.

7. The switchgear of claim 6 wherein said at least one spring release means is said second spring release means for releasing said opening spring means.

8. The switchgear of claim 2 wherein said coupling means comprises a lever mounted for rotation about a generally horizontal pivot axis, and said flexible elongated member comprises a flat strap in a plane bendable transverse to said generally horizontal pivot axis and having a lower end section engaging said lever.

9. The switchgear of claim 8 wherein said lower end section of said flat strap is twisted about 90° and has means engaging said lever.

10. The switchgear of claim 9 wherein said means engaging said lever comprises an aperture in said lower end section and a pin on said lever engaging said aperture.

11. The switchgear of claim 10 wherein said at least one spring release means is said first spring release means releasing said closing spring means and wherein said generally horizontal pivot axis moves laterally generally horizontally upon release of said closing spring means.

* * * * *